(12) United States Patent
Wang

(10) Patent No.: US 12,498,428 B2
(45) Date of Patent: Dec. 16, 2025

(54) MEASURING AND MONITORING DOWNHOLE TUBING ENCASED CONDUCTOR RESISTANCE

(71) Applicant: Halliburton Energy Services, Inc, Houston, TX (US)

(72) Inventor: Ziquan Wang, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 406 days.

(21) Appl. No.: 17/912,362

(22) PCT Filed: Apr. 24, 2020

(86) PCT No.: PCT/US2020/029750
§ 371 (c)(1),
(2) Date: Sep. 16, 2022

(87) PCT Pub. No.: WO2021/216083
PCT Pub. Date: Oct. 28, 2021

(65) Prior Publication Data
US 2023/0136000 A1    May 4, 2023

(51) Int. Cl.
*G01R 31/52* (2020.01)
*E21B 17/00* (2006.01)
(Continued)

(52) U.S. Cl.
CPC ............ *G01R 31/52* (2020.01); *E21B 17/003* (2013.01); *E21B 47/103* (2020.05); *E21B 47/12* (2013.01); *G01R 31/54* (2020.01)

(58) Field of Classification Search
CPC ......... G01R 31/52; G01R 31/54; E21B 47/12; E21B 44/00
See application file for complete search history.

(56) References Cited

U.S. PATENT DOCUMENTS 5,960,883 A * 10/1999 Tubel ................. E21B 44/00
166/313
2005/0200497 A1    9/2005  Smithson et al.
(Continued)

FOREIGN PATENT DOCUMENTS

CA          2353648        6/2000
KR       101091807 B1    12/2011
(Continued)

OTHER PUBLICATIONS

"Russian Federation Application No. 2022125031, Official Action", May 4, 2023, 5 pages.
(Continued)

*Primary Examiner* — Lam S Nguyen
(74) *Attorney, Agent, or Firm* — DeLizio, Peacock, Lewin & Guerra LLP

(57) ABSTRACT

A method comprises monitoring a resistance over time of a tubing encased conductor (TEC) that electrically connects a first downhole gauge to a second downhole gauge positioned in a borehole deeper than the first downhole gauge. The method includes detecting that a first TEC fault has occurred in the TEC, in response to a change in the resistance being greater than a fault occurrence threshold and in response to an amount of the time of the change being smaller than a fault time threshold.

21 Claims, 7 Drawing Sheets

(51) Int. Cl.
E21B 47/103 (2012.01)
E21B 47/12 (2012.01)
G01R 31/54 (2020.01)

(56) References Cited

U.S. PATENT DOCUMENTS

2013/0043048 A1* 2/2013 Joseph .................... E21B 47/12
166/381
2016/0161344 A1 6/2016 Laporta et al.
2016/0349302 A1 12/2016 Chevillard et al.
2019/0203586 A1 7/2019 Livescu et al.

FOREIGN PATENT DOCUMENTS

SU 1194998 11/1985
WO 2002054636 7/2002
WO 2021216083 A1 10/2021

OTHER PUBLICATIONS

PCT Application Serial No. PCT/US2020/029750, International Search Report, mailed Jan. 19, 2021, 3 pages.
PCT Application Serial No. PCT/US2020/029750, International Written Opinion, mailed Jan. 19, 2021, 7 pages.

* cited by examiner

MEASURING AND MONITORING DOWNHOLE TUBING ENCASED CONDUCTOR RESISTANCE

TECHNICAL FIELD

The disclosure generally relates to the field of downhole hydrocarbon recovery, and to measuring and monitoring downhole tubing encased conductor resistance.

BACKGROUND

During well completion, downhole tubing and equipment including downhole gauges are assembled in a borehole. Downhole gauges collect data about downhole conditions, such as pressure and temperature. To provide electrical current to downhole electronics equipment, one or more tubing encased conductor (TEC) can be used. A TEC connects to the downhole gauges which have been installed in the borehole.

BRIEF DESCRIPTION OF THE DRAWINGS

Embodiments of the disclosure may be better understood by referencing the accompanying drawings.

DESCRIPTION OF EMBODIMENTS

Figure 1:
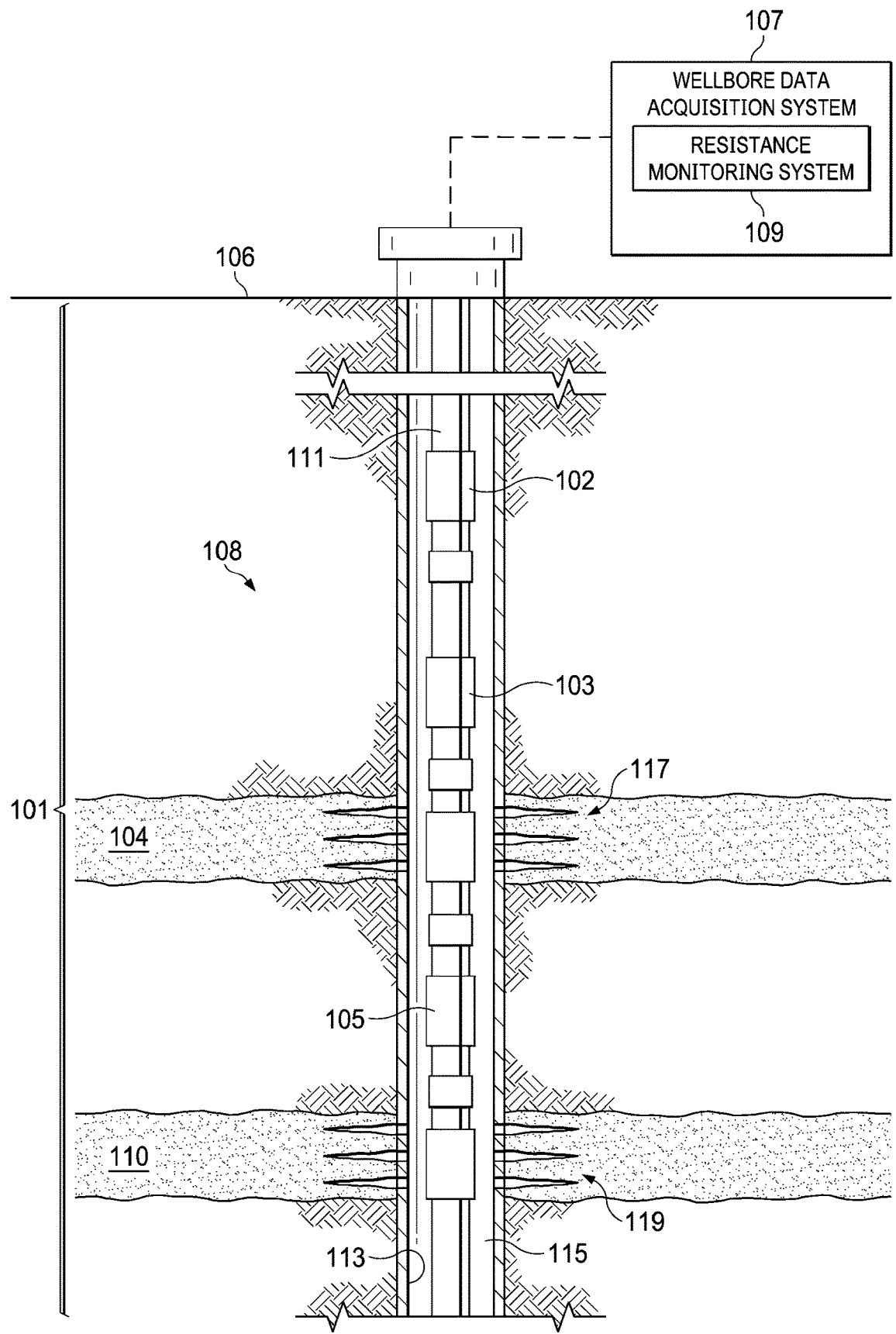
FIG. 1 is an example conceptual diagram of measuring TEC resistance based on downhole electronics data, according to some embodiments.

The description that follows includes example systems, methods, techniques, and program flows that embody aspects of the disclosure. However, it is understood that this disclosure may be practiced without these specific details. For instance, this disclosure refers to monitoring TEC resistance for TECs deployed in a two-zone completion in illustrative examples. Embodiments of this disclosure can be also applied to single zone completions or multiple zone completions with any number of zones. In other instances, well-known instruction instances, protocols, structures and techniques have not been shown in detail in order not to obfuscate the description.

During the life of a well, TECs which provide for the flow of electrical current to downhole electronics equipment may experience gradual or sudden failures. For instance, short circuiting events may provide a short-term effect on the TEC resistance, while prolonged exposure to extreme temperatures may contribute to a gradual change in resistance. To facilitate diagnosis of TEC failures, data can be collected from downhole gauges installed in a well. TEC resistance can be determined at intervals between downhole gauges to facilitate collection of information about downhole conditions between the downhole gauges, such as temperature or pressure, and to more accurately determine locations at which potential issues affecting the TEC have occurred.

Resistance of the TEC can be calculated during operation of the downhole gauges and evaluated to identify TEC faults. For instance, TEC faults can be identified based on sudden or unexpected changes in resistance. In some instances, such as downhole gauge failures or open or short circuiting which impacts the TECs, the associated error which is introduced may accumulate during calculation of a cumulative TEC resistance as the TEC resistance is measured at intervals of downhole gauges deeper in the well. To prevent error accumulation, TEC resistance can be calculated at each interval between downhole gauges by sequentially powering on the downhole gauges. Downhole gauges can be powered on sequentially beginning with the downhole gauge closest to the surface by enabling the flow of current to each downhole gauge. Downhole electronics data used to determine the TEC resistance can then be measured directly by downhole gauges and other completion components or indirectly through calculation upon powering on each downhole gauge. TEC resistance monitoring through sequentially powering on downhole gauges can also be used to predict the particular locations at which fault or failure of a TEC has occurred.

By utilizing the correlation between resistance and temperature, temperature changes and average temperatures between downhole gauges can also be determined based on TEC resistance measurements. Because the temperature is calculated with resistance data gathered for an interval downhole between two downhole gauges, the calculated temperature reflects the temperature as distributed throughout a region of the well rather than at a single point downhole. Identified changes in TEC resistance can be leveraged to detect downhole fluid events and to monitor fluid flow during fluid production or injection based on the calculated temperatures. As a result, fluid blockages and the presence of foreign fluids in the well can be detected.

Collected downhole electronics data and calculated TEC resistances can be leveraged to establish a model for TEC degradation over the life of the well. Downhole electronics data and TEC resistances can be collected and determined as downhole events occur, such as temperature changes or events impacting the underlying circuitry, and trends can be established based on observed patterns in TEC resistance as correlated with downhole events. From this model of TEC degradation, TEC failures resulting from both long-term and short-term degradation can be predicted.

FIG. 1 is an example conceptual diagram of measuring TEC resistance based on downhole electronics data, according to some embodiments. FIG. 1 depicts a two-zone completion in a formation 101 with a zone 110 and a zone 104 through which a borehole 115 has been drilled. The zones 104, 110 may be production zones or injection zones. Perforations 117, 119 have been created through casing 113 into the formation 101 in each of the zones 110, 104, respectively. A downhole system 108, which includes a downhole gauge 102, a downhole gauge 103, and a downhole gauge 105, have been installed in the borehole 115 as a result of well completion. While FIG. 1 depicts the downhole system 108 as including three downhole gauges, any number of downhole gauges may be installed. A power source at a surface 106 provides power to the downhole system 108. In this example, a wellbore data acquisition system 107 provides power to the downhole system 108.

A TEC 111 electrically couples the wellbore data acquisition system 107 to the downhole gauge 102. The TEC 111 also electrically couples the downhole gauge 102 to the downhole gauge 103. The TEC 111 electrically couples the downhole gauge 103 to the downhole gauge 105. The downhole gauges 102 and 103 can comprise a feedthrough for passage of the TEC 111 from the wellbore data acquisition system 107 to the downhole gauges 103 and 105, respectively. The TEC 111 can then conduct electricity to the downhole gauges 102, 103, 105 and other completion components of the downhole system 108. The TEC 111 may include one or more conductive materials, such as copper, aluminum, etc. The TEC 111 may comprise a single conductor TEC or a multi-conductor TEC. Though the TEC 111 is depicted as a single line, multiple TECs may be deployed downhole (e.g., by splicing ends of multiple TECs). The downhole gauges 102, 103, 105 can be current sources and can each measure the current which flows through the TEC 111. The downhole gauges 102, 103, 105 can also measure voltage. Through the TEC 111, the wellbore data acquisition system 107 obtains data including voltage and current measurements from each of the downhole gauges 102, 103, 105.

The wellbore data acquisition system 107 includes a resistance monitoring system 109 which can determine and monitor resistance of the TEC 111 (hereafter "TEC resistance"). The resistance monitoring system 109 can determine the TEC resistance based on downhole electronics data captured by the downhole gauges 102, 103, 105 and obtained by the wellbore data acquisition system 107. For example, the resistance monitoring system 109 can determine the TEC resistance during operation of the downhole system 108 or by sequentially powering on the downhole gauges 102, 103, 105 based on enabling the current flowing to each of the downhole gauges 102, 103, 105.

During operation of the downhole gauges 102, 103, 105 (i.e., when current flow to each of the downhole gauges 102, 103, 105 is enabled), the resistance monitoring system 109 can determine the TEC resistance based on voltage and current data captured for pairs of downhole gauges connected by the TEC 111. For instance, the resistance monitoring system 109 can calculate the resistance of the TEC 111 based on calculating the resistance of the TEC 111 at the interval between the downhole gauges 102, 103 and the downhole gauges 103, 105. The TEC resistances calculated at each interval between the downhole gauges 102, 103 and the downhole gauges 103, 105 can be added to the resistance of the TEC 111 between the surface 106 and the downhole gauge 102 to yield a cumulative TEC resistance for the downhole system 108. The resistance monitoring system 109 can determine the TEC resistance incrementally in this manner beginning with the downhole gauge closest to the surface 106 and continuing through the downhole gauge deepest in the formation 101 (e.g., the downhole gauges 102, 105, respectively). Calculating TEC resistance during operation of the downhole gauges 102, 103, 105 in this manner is further described in reference to FIG. 4.

In some cases, determining the TEC resistance during operation of the downhole system 108 may result in error accumulation as the TEC resistance is calculated at each interval of the TEC 111 between downhole gauges. For instance, short circuits, open circuits, or leakage currents affecting the TEC 111 may introduce error into the resistance calculation which are carried through as the TEC resistance is calculated for subsequent pairs of downhole gauges deeper in the formation 101. Error accumulation can be avoided and issues of the TEC 111 which introduce error can be diagnosed by sequentially powering on the downhole gauges 102, 103, 105 from the downhole gauge closest to the surface 106 to the downhole gauge deepest in the formation 101. The downhole gauges 102, 103, 105 can be powered on by enabling the flow of current from the preceding downhole gauge. For instance, the downhole gauge 102 can control the flow of current through the TEC 111 to the downhole gauge 103. The downhole gauge 103 can effectively be powered off by disabling the flow of current from the downhole gauge 102 or powered on by enabling the flow of current from the downhole gauge 102.

As each downhole gauge is powered on (e.g., based on a request or command communicated from the wellbore data acquisition system 107 to the downhole gauge), the resistance monitoring system 109 can obtain a measurement of the current draw directly measured by the downhole gauge and can calculate a theoretical value of the current measured by the downhole gauge. If the difference between the directly measured current draw and the theoretical current draw is substantial (e.g., exceeds a threshold), the resistance monitoring system 109 can determine that an issue which impacts the TEC 111 exists, such as a leakage current. The resistance monitoring system 109 can then estimate the location of the TEC 111 issue which is occurring based on the data collected following each power on event. For instance, a leakage current may be present between the downhole gauges 102, 103. The resistance monitoring system 109 can predict the location of the leakage current with respect to the downhole gauges 102, 103 based on the resistance of the TEC 111 between the downhole gauges 102, 103, the current measurements obtained from the downhole gauge 102, 103 current sources, the current flowing to the downhole gauges 102, 103, and voltage data. Determining TEC resistance and diagnosing faults through sequentially powering on downhole gauges is further described in reference to FIG. 5.

The resistance monitoring system 109 may additionally estimate the TEC resistance based on the length of the TEC 111. The resistance monitoring system 109 can periodically compare the estimated resistance to the resistance calculated for the TEC 111 for the downhole system 108, such as a cumulative TEC resistance based on determining the resistance between the surface 106 and the downhole gauge 102 and between each of the downhole gauges 102, 103, 105 either during operation of the downhole gauges 102, 103, 105 or as a result of sequentially powering on each of the downhole gauges 102, 103, 105. TEC faults can be identified based on determining that the calculated resistance has significantly deviated from the estimated resistance. For instance, the resistance monitoring system 109 may determine that a leakage current flowing from the TEC 111 has occurred based on the calculated resistance and the estimated resistance exceeding a threshold. Increasing deviations of the calculated resistance from the estimated resistance may indicate gradual degradation of the TEC 111.

Faults occurring in the circuitry underlying the downhole system 108 which impact the resistance of the TEC 111 can be sudden, such as those caused by damage to the TEC 111 or short circuit, while changes in TEC resistance caused by aging of the TEC 111 may be gradual. The resistance monitoring system 109 monitors changes and trends in TEC resistance over the life of the well and can establish a model for degradation of the TEC 111 based on historical resistance data and observed trends in resistance, such as those based on correlations between changes in TEC resistance and data collected from downhole events (e.g., temperature changes, short circuiting, downhole gauge failures, etc.). The resistance monitoring system 109 can also leverage this model to predict failures of the TEC 111 caused by sudden changes in resistance, such as short circuiting, or gradual changes in resistance, such as temperature changes.

Figure 2:
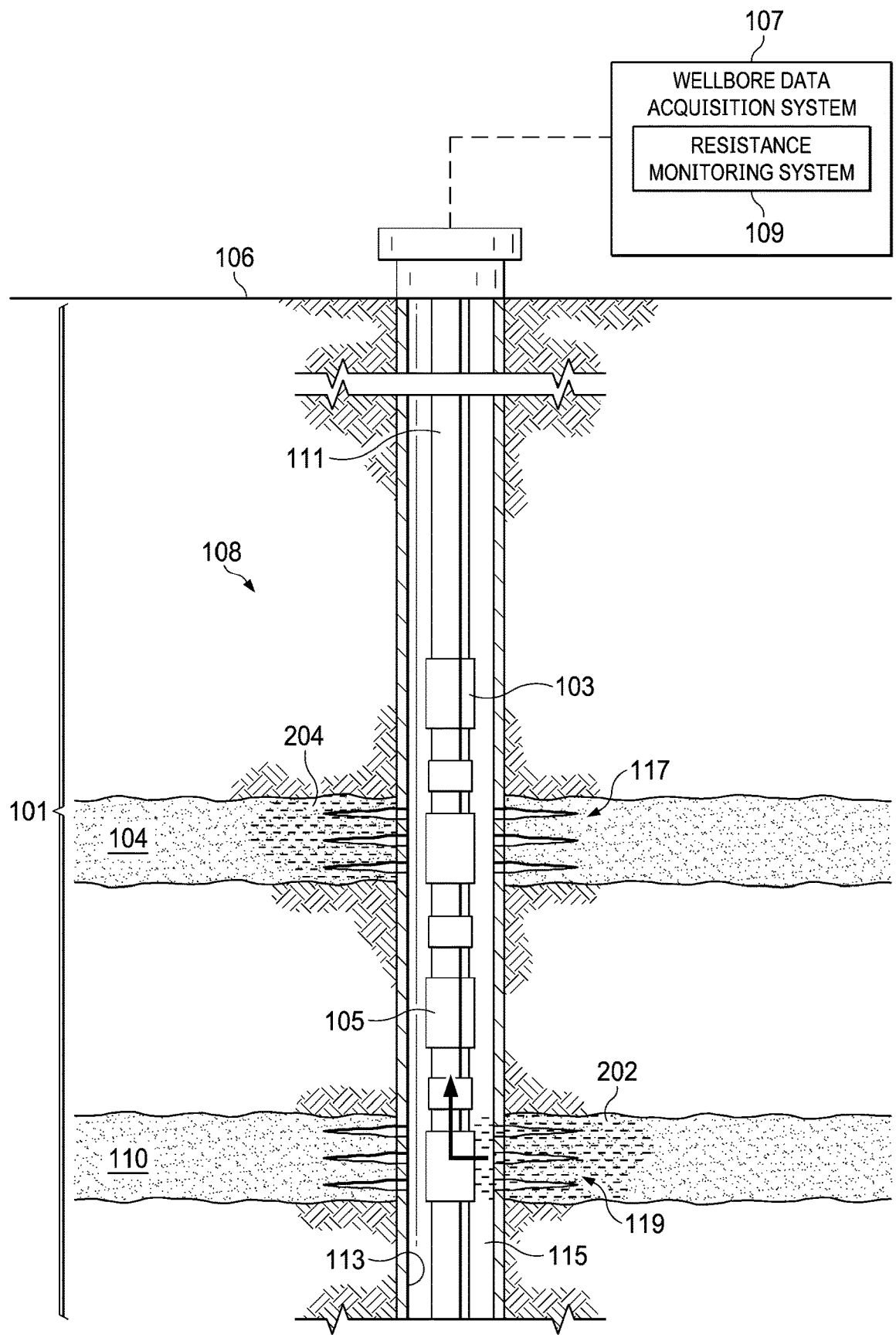
FIG. 2 depicts an example conceptual diagram for detecting downhole fluid events based on TEC resistance data, according to some embodiments.

FIG. 2 depicts an example conceptual diagram for detecting downhole fluid events based on TEC resistance data, according to some embodiments. FIG. 2 depicts the downhole gauges 103, 105 and the TEC 111 of the downhole system 108 installed in the borehole 115. In this example, fluid 202 produced by the zone 110 flows through the perforations 119. A fluid 204 from the zone 104 flows through the perforations 117. However, the fluid 204 may be an unknown or unanticipated fluid which has entered the borehole 115, such as water from the formation 101.

Figure 3:
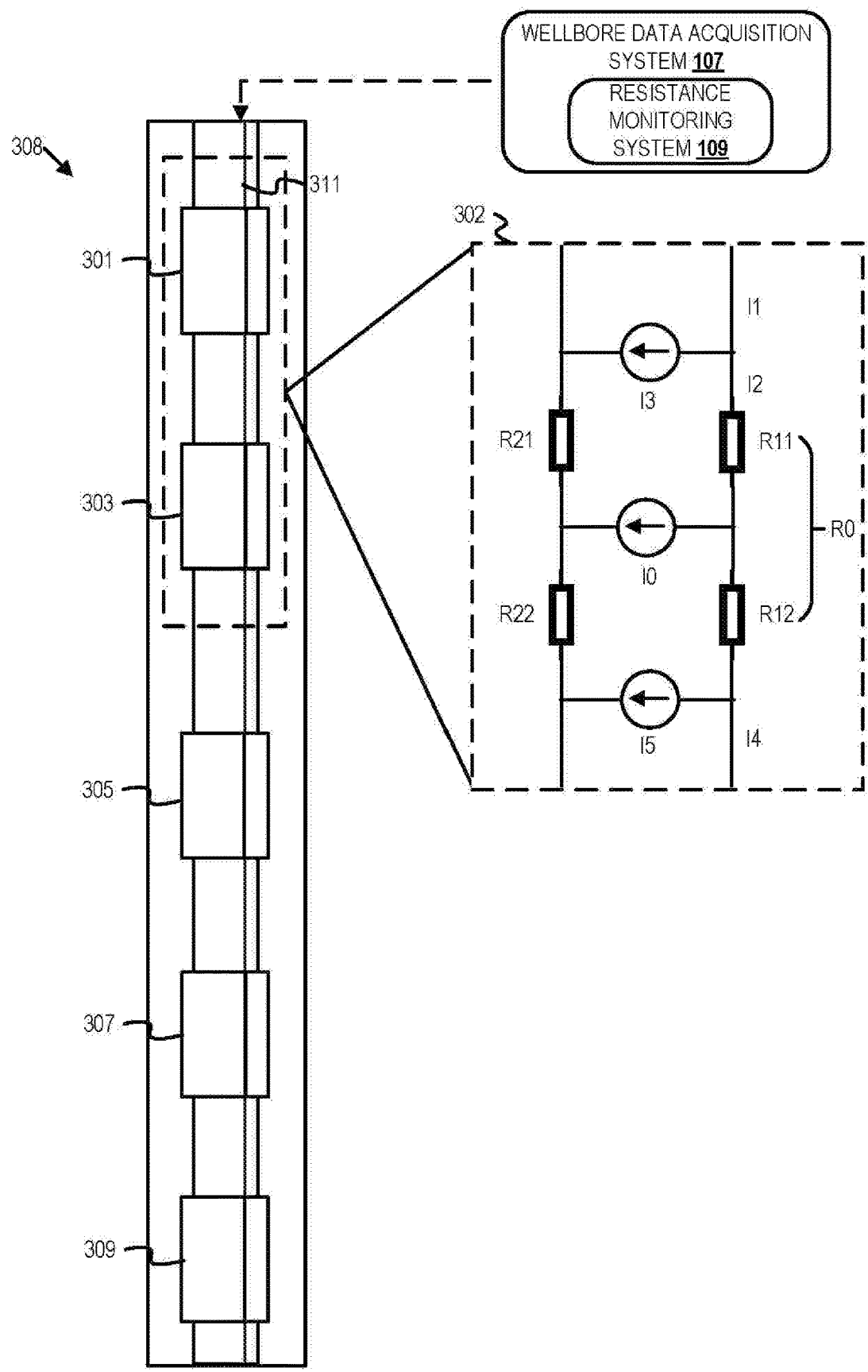
FIG. 3 is an example conceptual diagram of leveraging downhole electronics data to diagnose TEC issues, according to some embodiments.

The resistance monitoring system 109 can detect changes in downhole fluid flow based on calculating the TEC 111 resistance. The resistance monitoring system 109 determines the resistance of the TEC 111 at an interval downhole between downhole gauges (e.g., the interval of the TEC between the downhole gauges 103, 105) between the surface 106 and the downhole gauge nearest to the surface 106, such as the downhole gauge 103 as depicted in FIG. 3. The TEC resistance can be determined either during operation of the downhole gauges 103, 105 or as a result of sequentially powering on the downhole gauges 103, 105 and determining the resistance after each power on event. The resistance monitoring system 109 can then calculate the average downhole temperature between the downhole gauges 103, 105 based on the determined TEC resistance. The temperature which is calculated based on TEC resistance data can be considered an average temperature for the formation 101 between the depths of the downhole gauges between which the TEC resistance was determined rather than a temperature measured at a single point. The average temperature T between downhole gauges can be calculated with Equation 1, where T is the conductor temperature of the TEC 111, R is the resistance of the TEC 111 at temperature T, α is the temperature coefficient of resistance for the material of the TEC 111, $T_{ref}$ is the reference temperature at which α is specified, and $R_{ref}$ is the TEC 111 resistance at a reference temperature $T_{ref}$.

$$R = R_{ref}[1 + \alpha(T - T_{ref})] \quad (1)$$

The temperature coefficient of resistance a at temperature $T_{ref}$ is determined based on the material of the TEC 111. For example, if a conductor material of the TEC 111 is copper, the temperature coefficient of resistance a at $T_{ref}$ 20 degrees Celsius is approximately 0.004 per degree Celsius. Temperature changes such as those caused by changes in downhole fluid flow affect TEC resistance. For instance, if the conductor material of the TEC 111 is copper or another pure metal, the resistance of the TEC 111 may increase as fluids produced by the zones 110, 104 progress towards the surface 106 due to the high temperature of the fluids. Flow of lower temperature fluids such as water from the formation 101 through the borehole 115 to the surface 106 may cause a decrease in temperature and a corresponding decrease in resistance of the TEC 111.

In this example, the fluid 202 is a fluid produced by the zone 104. While monitoring resistance of the TEC 111 for the interval between the downhole gauge 105 and the downhole gauge 103, the resistance monitoring system 109 may detect a gradual increase in resistance of the TEC 111 in this interval as the flow of the fluid 202 progresses towards the surface 106 (e.g., based on comparison with a baseline resistance). The resistance monitoring system 109 can then predict the progress of the flow of the fluid 202 based on the determined TEC resistance. As a result, blockages downhole can be identified if the TEC resistance between the downhole gauges 103, 105 does not gradually increase as expected. For instance, the resistance monitoring system 109 may determine that the temperature has increased between the downhole gauges 105, 103 after the fluid 202 has entered the borehole 115, while the temperature between the downhole gauge 103 and the surface 106 may not increase similarly. The resistance monitoring system 109 may then identify a potential blockage between the downhole gauges 103, 105 which prevents the flow of the fluid 202.

A fluid 204 also enters the borehole 115. This fluid may correspond to an unanticipated fluid, such as water from the formation 101. Upon detection of a gradual decrease in the TEC resistance between the downhole gauge 103 and the downhole gauge 105, the resistance monitoring system 109 can identify that a foreign agent has entered the borehole 115. Gradual changes in temperature may be identified over a series of time instances and/or based on comparison with a baseline temperature. For example, the resistance monitoring system 109 can identify a decrease in temperature if the difference between the temperature decrease and a baseline temperature exceeds a threshold. The resistance monitoring system may generate a notification that an unexpected fluid has entered the borehole 115 which may indicate the location with respect to the downhole gauges 103, 105, the calculated temperature, etc. The resistance monitoring system 109 can thus differentiate between gradual changes in resistance caused by temperature change and sudden changes caused by TEC 111 faults or failures to provide a comprehensive assessment of both conditions of the TEC 111 and conditions downhole.

Increases in resistance of the TEC 111 due to an increase in temperature, such as an increase in temperature resulting from flow of the fluid 202, may impact the rate of communication between the wellbore data acquisition system 107 and the downhole gauges 103, 105. For instance, the rate of communication may decrease, or communication failures may occur. To mitigate the impact of the increased resistance on communications between the downhole gauges 103, 105 and the wellbore data acquisition system 107, the resistance monitoring system 109 may indicate to the wellbore data acquisition system 107 that the amplitude of communication signal and/or supply voltage to the downhole system 108 should be increased based on detecting an increase in TEC resistance related to downhole temperature. If communication failures have occurred due to the increase in resistance, the resistance monitoring system 109 may indicate to the wellbore data acquisition system 107 to reduce the rate of communication to prevent communication failures.

FIG. 3 is an example conceptual diagram of leveraging downhole electronics data to diagnose TEC issues, according to some embodiments. FIG. 3 depicts a downhole system 308 with five downhole gauges connected by a TEC 311: a downhole gauge 301, a downhole gauge 303, a downhole gauge 305, a downhole gauge 307, and a downhole gauge 309. The downhole system 308 may include other components which are not depicted in FIG. 3, such as packers, inflow control valves, etc. Though the TEC 311 is depicted as a single line, implementations may use multiple TECs (e.g., by splicing ends of multiple TECs). FIG. 3 depicts an example of diagnosing TEC 311 faults for the interval of the TEC 311 formed by the downhole gauges 301, 303. However, TEC 311 fault diagnosis may be performed for any interval of the TEC 311 between consecutive downhole gauges. In this example, a leakage current $I_0$ flows through the TEC 311 at the interval between the downhole gauges 301, 303. The wellbore data acquisition system 107 measures source voltage and/or current which are provided for the downhole system 308.

Circuitry 302 (or a "circuit 302") underlies the downhole gauges 301, 303, 305, 307, 309, and the TEC 311. FIG. 3 depicts the circuitry 302 underlying the downhole gauges 301, 303 and the TEC 311 which connects the downhole gauges 301, 303. The circuit 302 may be configured for high side current sensing or low side current sensing. As depicted in the circuit 302, the downhole gauges 301, 303 comprise current sources, represented as currents $I_3$ and $I_5$, respectively. The downhole gauges 301, 303 may be constant current sources. The TEC resistance for the interval connecting the downhole gauges 301, 303 is depicted with resistances $R_{11}$ and $R_{22}$, where the leakage current $I_0$ flows from the TEC 311 between $R_{11}$ and $R_{22}$. The resistance of the TEC 311 between the downhole gauges 301, 303 modeled by $I_3$ and $I_5$ can be represented as $R_0$, depicted below in Equation 2 as the sum of $R_{11}$ and $R_{12}$.

$$R_0 = R_{11} + R_{12} \quad (2)$$

The total resistance $R_0$ between the downhole gauges 301, 303 may be determined from historical TEC resistance data or estimated based on the length of the TEC 311 between the downhole gauges 301, 303. The circuit 302 also depicts TEC resistances $R_{21}$ and $R_{22}$ which oppose a return current. The TEC resistances $R_{21}$ and $R_{22}$ may generally be close to zero and can thus be assumed to be negligible. The current $I_1$ is the output current from the wellbore data acquisition system 107 and can be measured by the wellbore data acquisition system 107. The current $I_2$ which flows to the downhole gauge $I_5$ can be calculated based on the known currents $I_1$ and $I_3$. The current $I_2$ is also equivalent to the sum of the leakage current $I_0$ and the current Is. These relationships are depicted in Equation 3, where $I_1$ is the measured current supplied to the downhole system (e.g., the current supplied by the wellbore data acquisition system 107), $I_3$ is the current measured by the downhole gauge 301, and $I_5$ is the current measured by the downhole gauge 303.

$$I_1 - I_3 = I_2 = I_0 + I_5 \quad (3)$$

Equation 4 depicts the relationship of the voltage $V_1$ measured at the downhole gauge 301 and the voltage $V_2$ at the downhole gauge 303, the resistances $R_{11}$ and $R_{22}$, the current $I_5$ measured by the downhole gauge 303, and the leakage current $I_0$.

$$V_1 = V_2 + I_5 R_{12} + (I_5 + I_0) R_{11} \quad (4)$$

The system of equations formed by Equations 2-4 can be used to solve for $R_{11}$ and $R_{12}$ based on the measured voltages, measured current Is, and calculated leakage current $I_0$. Once the resistances $R_{11}$ and $R_{12}$ have been determined, the resistance monitoring system 109 can estimate where the leakage current $I_0$ is occurring with respect to the downhole gauge 301 and the downhole gauge 303. The location of the leakage current $I_0$ can be identified based on the relative proportions of the calculated resistances $R_{11}$ and $R_{12}$ to the total resistance $R_0$ between the downhole gauges 301, 303. For example, the resistance monitoring system 109 may calculate a value of $R_{11}$ which is 40% of the total resistance $R_0$. The resistance monitoring system 109 can then determine that the leakage current $I_0$ is occurring approximately 40% of the distance from the downhole gauge 301 to the downhole gauge 303. The resistance monitoring system 109 can thus determine where current leakages or other faults of the TEC 311 occur at an increased degree of specificity.

Figure 4:
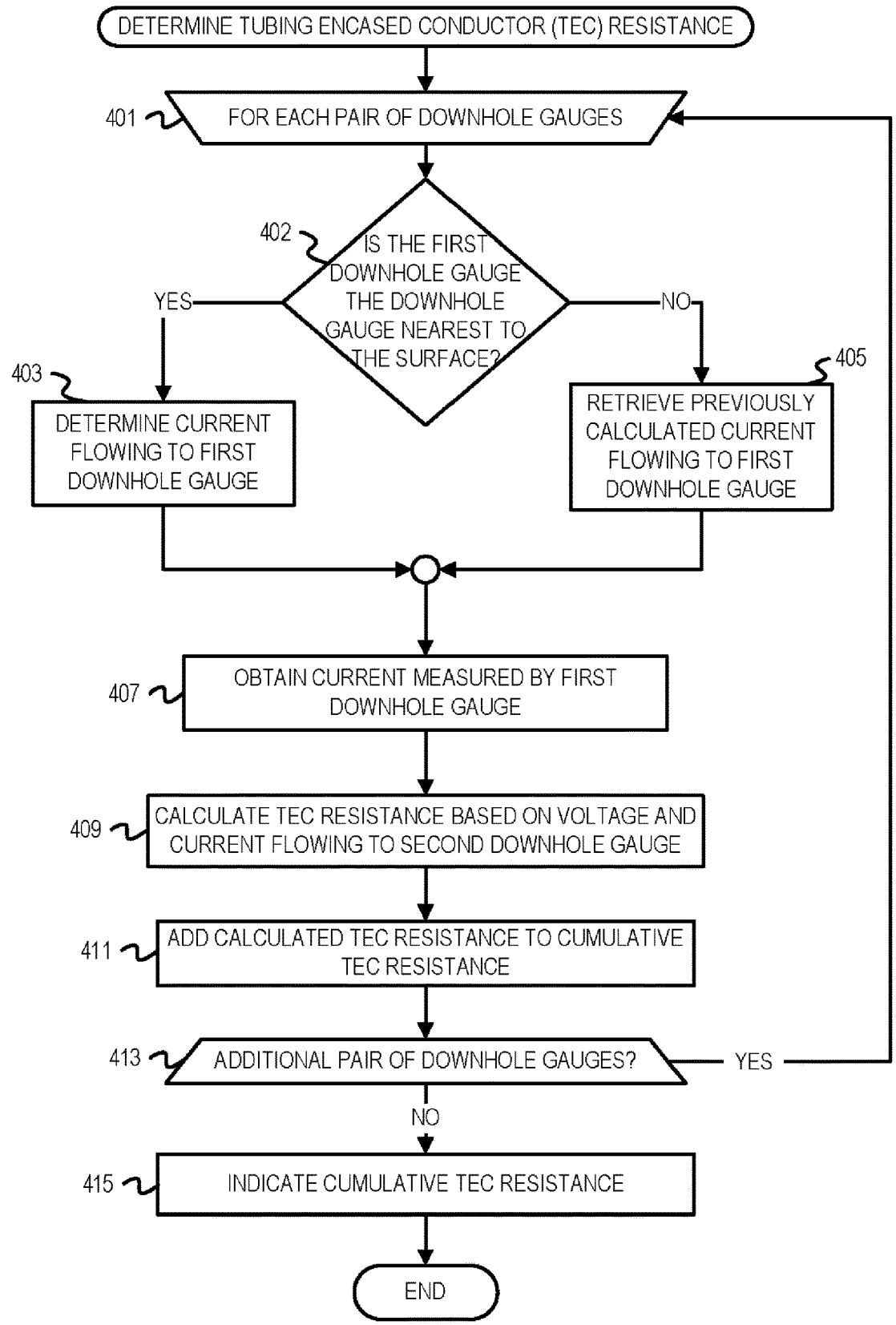
FIG. 4 depicts a flowchart of example operations for determining the TEC resistance for a downhole system, according to some embodiments.

FIG. 4 depicts a flowchart of example operations for determining the TEC resistance for a downhole system, according to some embodiments. The example operations refer to a resistance monitoring system as performing the depicted operations for consistency with FIG. 1, although naming of software and program code can vary among implementations. The example operations can be performed by software, firmware, hardware, or a combination thereof.

At block 401, the resistance monitoring system begins determining the resistance of the TEC between each pair of downhole gauges. As used herein, a pair of downhole gauges refers to consecutive downhole gauges which are connected by a TEC. For example, with reference to FIG. 1, the downhole gauges 102, 103 and the downhole gauges 103, 105 each form a pair, where the TEC resistance between each pair is measured. The downhole gauge in a pair which is closer to the surface is hereinafter referred to as the "first downhole gauge," and the downhole gauge in a pair which is deeper in the formation is hereinafter referred to as the "second downhole gauge." For instance, with reference to FIG. 1, when determining TEC resistance between the downhole gauges 102, 103, the downhole gauge 102 is the first downhole gauge, and the downhole gauge 103 is the second downhole gauge.

At block 402, the resistance monitoring system determines if the first downhole gauge is the downhole gauge installed nearest to the surface. The resistance monitoring system will determine the current flowing to the first downhole gauge based on whether the first downhole gauge is the downhole gauge closest to the surface (e.g., the downhole gauge 102 in FIG. 1). For instance, a wellbore data acquisition system such as the wellbore data acquisition system 107 of FIG. 1 may store the measured depths at which the downhole gauges have been installed. If the first downhole gauge is the downhole gauge nearest to the surface, operations continue at block 403. If the first downhole gauge is not the downhole gauge nearest to the surface, operations continue at block 405.

At block 403, the resistance monitoring system determines the current flowing to the first downhole gauge. In the case where the first downhole gauge is the downhole gauge closes to the surface, the current flowing through the TEC to the downhole system can be equivalent to the current flowing to the first downhole gauge. For instance, in reference to FIG. 1, the current flowing to the first downhole gauge may be determined based on the current provided to the downhole system 108 by a power supply of the wellbore data acquisition system 107.

At block 405, the resistance monitoring system retrieves a previously determined current corresponding to the current flowing to the first downhole gauge. The resistance monitoring system can obtain the current which was previously calculated based on the current measured by a preceding downhole gauge and current flowing to the preceding downhole gauge. For instance, the resistance monitoring system can retrieve the current calculated at block 409 using Equation 6 during a previous iteration.

At block 407, the resistance monitoring system obtains a current measured by the first downhole gauge. The first downhole gauge can be a current source in the downhole system and measures the current flow which is diverted to it at the first downhole gauge itself. Current readings from the first downhole gauge can be communicated to a wellbore data acquisition system. For instance, with reference to FIG. 1, the wellbore data acquisition system 107 may obtain a current measured by the downhole gauge 102. The resistance monitoring system can then retrieve the current measured by the downhole gauge 102 from the wellbore data acquisition system 107.

At block 409, the resistance monitoring system calculates the TEC resistance between the first and second downhole gauges based on the voltage across the first and second downhole gauges and the current flowing to the second downhole gauge. The current flowing to the second downhole gauge is equivalent to the difference between the current flowing to the first downhole gauge and the current measured by the first downhole gauge (i.e., the currents determined at blocks 403/405 and 407, respectively). The resistance monitoring system can calculate the TEC resistance between the first and second downhole gauges using Ohm's law, represented below as Equation 5, where R is the TEC resistance, V is the voltage difference between the first and second downhole gauges, and I is the current flowing to the second downhole gauge. The current I flowing to the second downhole gauge can be determined with the calculation depicted as Equation 6, where $I_1$ is the current flowing to the first downhole gauge and $I_2$ is the current which was diverted to the first downhole gauge which it measures. Alternatively, the first downhole gauge can determine I by measuring the current I on its output to the second downhole gauge.

$$R = \frac{V}{I} \quad (5)$$

$$I = I_1 - I_2 \quad (6)$$

At block 411, the resistance monitoring system adds the calculated TEC to a cumulative TEC resistance. The cumulative TEC resistance is a cumulative value of the TEC resistance as TEC resistance is calculated at intervals between downhole gauges. The cumulative TEC resistance may have been initialized with the TEC resistance between the surface and the downhole gauge nearest to the surface (e.g., as measured by a wellbore data acquisition system).

At block 413, the resistance monitoring system determines if an additional pair of downhole gauges exists. Another pair of downhole gauges can be determined to exist if the second downhole gauge was not the downhole gauge of the downhole system at the deepest measured depth (e.g., the downhole gauge 105 in FIG. 1). If an additional pair of downhole gauges exists, operations continue at block 401. If an additional pair of downhole gauges does not exist, operations continue at block 415.

At block 415, the resistance monitoring system indicates the cumulative TEC resistance. Once the TEC resistance has been calculated at each interval of a downhole system, the cumulative TEC resistance will correspond to the resistance of the TEC calculated for the downhole system as a whole. For instance, the resistance monitoring system may generate a notification indicating the cumulative TEC resistance once the cumulative TEC resistance has been determined. The cumulative TEC resistance may be stored for subsequent analysis for incorporation into a model of TEC degradation.

Figure 5:
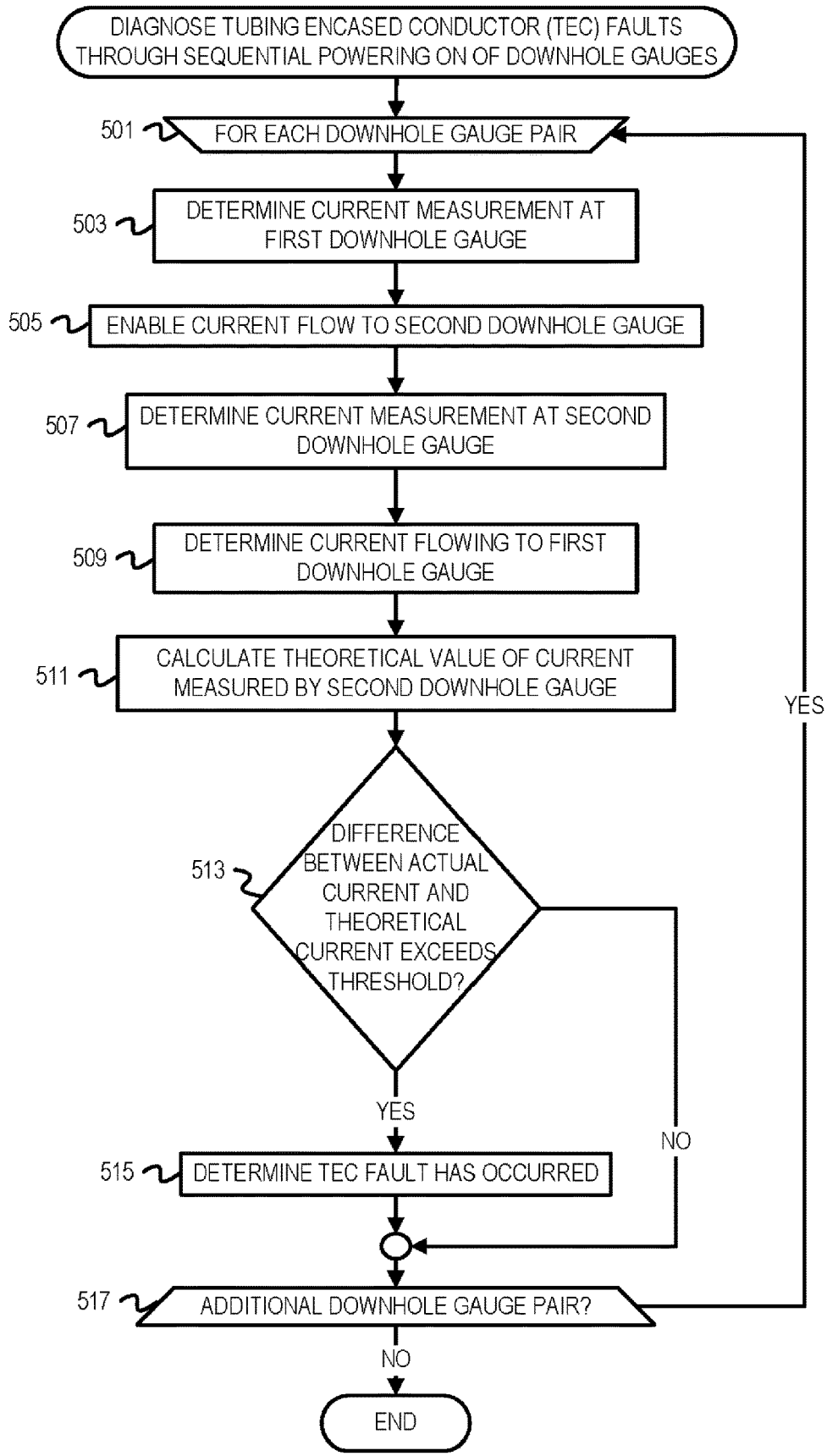
FIG. 5 depicts a flowchart of example operations for diagnosing TEC failures through sequentially powering on downhole gauges and determining TEC resistance, according to some embodiments.

FIG. 5 depicts a flowchart of example operations for diagnosing TEC failures through sequentially powering on downhole gauges and determining TEC resistance, according to some embodiments. Each downhole gauge can enable or disable the flow of current to the next deepest downhole gauge to provide for the flow of an electric current to the subsequent downhole gauge. The example operations assume an initial state in which current flows to the downhole gauge nearest to the surface, which has disabled the flow of current to the next deepest downhole gauge. The example operations refer to a resistance monitoring system as performing the depicted operations for consistency with FIG. 1, although naming of software and program code can vary among implementations. The example operations can be performed by software, firmware, hardware, or a combination thereof.

At block 501, the resistance monitoring system begins determining TEC resistance for each downhole gauge pair. A downhole system may include at least a first and second downhole gauge between which the corresponding TEC resistance is determined. As similarly described in reference to FIG. 4, a pair of downhole gauges refers to consecutive downhole gauges which are connected by a TEC. The downhole gauge in a pair which is closer to the surface is hereinafter referred to as the "first downhole gauge," and the downhole gauge in a pair which is deeper in the formation is hereinafter referred to as the "second downhole gauge."

At block 503, the resistance monitoring system obtains a measurement of the current as measured by the first downhole gauge. The first downhole gauge comprises a current source and may directly measure the current which is diverted to the first downhole gauge. The resistance monitoring system retrieves the current measured by the first downhole gauge. For instance, with reference to FIG. 1, the resistance monitoring system can retrieve the current measured by the downhole gauge 102 which was communicated to the wellbore data acquisition system 107.

At block 505, the resistance monitoring system enables the current flow from the first downhole gauge to the second downhole gauge. For instance, the resistance monitoring system may communicate a request to the first downhole gauge to enable the flow of current to the second downhole gauge. As a result of enabling the current flow to the second downhole gauge, the second downhole gauge can be powered on.

At block 507, the resistance monitoring system obtains a measurement of the actual current as measured by the second downhole gauge. The second downhole gauge also comprises a current source and may directly measure the current which is diverted to the second downhole gauge. The current measurement obtained from the second downhole gauge is hereinafter referred to as the "actual current measurement." The resistance monitoring system retrieves the current measured by the second downhole gauge. For instance, with reference to FIG. 1, the resistance monitoring system can retrieve the current measured by the downhole gauge 103 which was communicated to the wellbore data acquisition system 107.

At block 509, the resistance monitoring system determines the current flowing to the first downhole gauge. The current flowing to the first downhole gauge is determined based on whether the first downhole gauge is the downhole gauge closest to the surface. If the first downhole gauge is the downhole gauge which is closest to the surface, the current flowing to the first downhole gauge is the current which is supplied to the downhole system. For instance, with reference to FIG. 1, the current flowing to the first downhole gauge is the current output of the wellbore data acquisition system 107. If the first downhole gauge is not the downhole gauge closest to the surface, the current flowing to the first downhole gauge can be calculated based on current measurements obtained for the downhole gauge next closest to the surface. For instance, the resistance monitoring system can calculate the current flowing to the first downhole gauge as the difference between the current flowing to the downhole gauge next closest to the surface and the current measured by the downhole gauge next closest to the surface.

At block 511, the resistance monitoring system calculates a theoretical value of a current which is measured by the second downhole gauge. If there are no TEC faults, such as a leakage current flowing from the TEC, the current diverted to the second downhole gauge which is measured by the second downhole gauge will generally be similar to the current flowing to the second downhole gauge. The current flowing to the second downhole gauge can thus be considered a theoretical current measurement. The resistance monitoring system can calculate the theoretical current by calculating the difference between the current flowing to the first downhole gauge and the current measured by the first downhole gauge (e.g., the current measurements obtained at blocks 509 and 503, respectively).

At block 513, the resistance monitoring system determines whether the difference between the actual current and the theoretical current exceeds a threshold. The resistance monitoring system may enforce a threshold for a maximum difference between the actual current and theoretical current. A difference between the actual current and the theoretical current which exceeds the threshold can indicate a TEC fault. The threshold can be a predetermined value, a percentage of the actual current (e.g., 5% of the actual current), etc. If the difference between the actual current and the theoretical current exceeds the threshold, operations continue at block 515. If the difference between the actual current and the theoretical current does not exceed the threshold, operations continue at block 517.

At block 515, the resistance monitoring system determines that a TEC fault has occurred. For instance, the resistance monitoring system may generate a notification that a TEC fault has occurred. The resistance monitoring system may also predict the location downhole at which the TEC fault was identified based on TEC resistance data, such as described in reference to FIG. 3.

At block 517, the resistance monitoring system determines whether an additional downhole gauge pair exists. If an additional downhole gauge pair exists, operations continue at block 501. If no additional downhole gauge pair exists, operations are complete.

Figure 6:
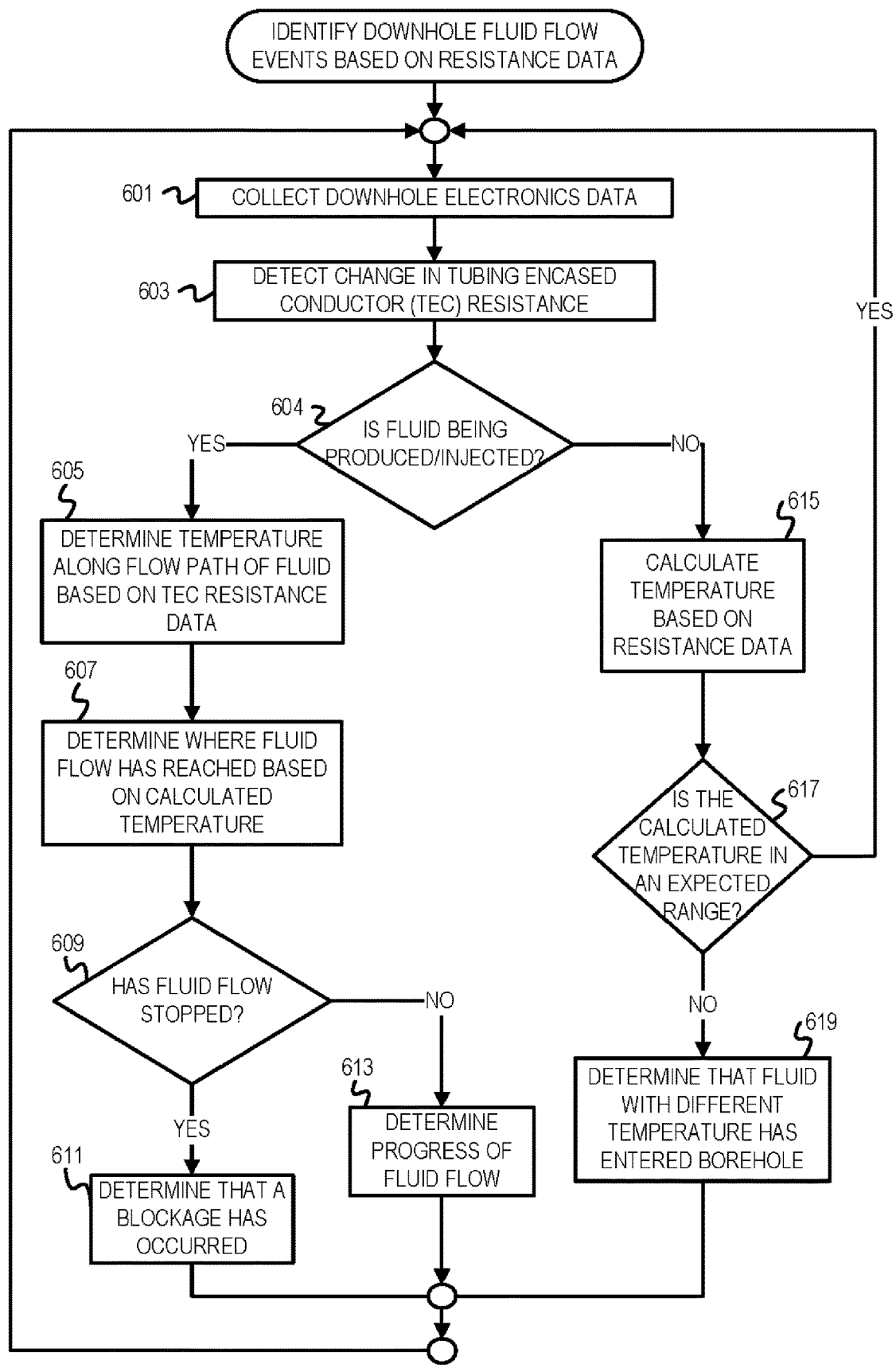
FIG. 6 depicts a flowchart of example operations for identifying downhole fluid events based on TEC resistance data, according to some embodiments.

FIG. 6 depicts a flowchart of example operations for identifying downhole fluid events based on TEC resistance data, according to some embodiments. The example operations refer to a resistance monitoring system as performing the depicted operations for consistency with FIG. 2, although naming of software and program code can vary among implementations. The example operations may be performed periodically during the life of a well or may be ongoing. The example operations can be performed by software, firmware, hardware, or a combination thereof.

At block 601, the resistance monitoring system collects downhole electronics data. The resistance monitoring system may periodically collect downhole electronics data and leverage the downhole electronics data to determine TEC resistance (e.g., as described in reference to FIG. 4). For instance, the resistance monitoring system may determine the TEC resistance between a pair of downhole gauges or for a downhole system as a whole. The TEC resistance data may be correlated with the downhole location, such as the location between two downhole gauges at which the resistance was determined.

At block 603, the resistance monitoring system detects that a change in the TEC resistance has occurred. Detection of changes in TEC resistance may be triggered by increases or decreases in resistance for a particular downhole location which exceed a threshold (e.g., a location between downhole gauges), where the resistance monitoring system may enforce a threshold for resistance changes. The threshold may be indicative of an increase or decrease in TEC resistance which triggers detection of a change, such as an increase or decrease with respect to a baseline resistance (e.g., a 5% or 10% increase or decrease), an increase or decrease which occurs over a determined time window, etc.

At block 604, the resistance monitoring system determines whether fluid is being produced or injected. During production or injection of fluids, temperature changes can be monitored based on TEC resistance data to determine the progression of fluid flow and identify whether a blockage has potentially occurred downhole. Temperature changes can also be monitored to determine whether a foreign agent or unknown substance has entered the borehole. Information indicating whether downhole operations are ongoing may be made available to the resistance monitoring system. If fluid production or injection are ongoing, operations continue at block 605. If fluid production or injection are not ongoing, operations continue at block 615.

At block 605, the resistance monitoring system collects downhole electronics data for intervals of the TEC and for downhole gauges along the flow path of the fluid being produced or injected and calculates the corresponding downhole temperature. The resistance monitoring system can associate the collected downhole electronics data with the corresponding downhole location as described at block 601 (e.g., in relation to an interval between downhole gauges). The resistance monitoring system can calculate the temperature with Equation 1 at each location for which downhole electronics data was collected based on TEC resistance data. For instance, with reference to FIG. 1, if a fluid produced by the zone 110 enters the borehole through the perforations 119 and is expected to flow to the surface, the resistance monitoring system can calculate the temperature between the downhole gauges 105, 103 and between the downhole gauge 103, 102.

At block 607, the resistance monitoring system determines the location which the fluid flow has reached based on the calculated temperature. Gradual increases or decreases in the temperature at a particular downhole location may indicate the presence of a fluid at the downhole location. For example, as high temperature fluid progresses uphole during fluid production and causes an increase in TEC resistance, a corresponding increase in temperature may be observed. As another example, injection of colder fluid may contribute to a decrease in TEC resistance and a corresponding decrease in observed temperature. The resistance monitoring system can determine the location the flow has reached based on observing temperature changes for downhole locations over a determined time window, by comparing the temperature calculated from TEC resistance data to a baseline, etc. For example, with reference to FIG. 1, during production of a fluid by the zone 110, the difference between the temperature calculated based on the TEC 111 resistance calculated between the downhole gauges 105, 103 and a baseline temperature may exceed a threshold, while the difference between the baseline and the temperature calculated based on the TEC 111 resistance calculated between the downhole gauges 103, 102 may not exceed a threshold. The resistance monitoring system can thus determine that the fluid is progressing uphole between the downhole gauges 105, 103 and has not yet reached the downhole gauge 102.

At block 609, the resistance monitoring system determines whether fluid flow has stopped. Temperature calculations which do not indicate an increase or decrease in temperature expected to result from production of higher temperature fluids or injection of lower temperature fluids may indicate fluid flow has stopped, such as due to a blockage. The resistance monitoring system can thus determine that the fluid flow has stopped if no temperature change is observed based on resistance data corresponding to an interval of the TEC. For example, if fluid is being produced by the zone 110 and the temperature between the downhole gauges 103, 102 does not deviate from a baseline over a threshold period of time, the resistance monitoring system may determine that a blockage has occurred downhole below the downhole gauge 103. If fluid flow is determined to have stopped, operations continue at block 611. If fluid flow is not determined to have stopped, operations continue at block 613.

At block 611, the resistance monitoring system determines that a blockage has occurred downhole. The resistance monitoring system may generate a notification indicating a potential blockage has occurred and the downhole interval for which the expected change in temperature did not occur. For example, the resistance monitoring system may output a notification indicating the temperature calculated for each interval downhole based on the TEC resistance data and/or the measured depth(s) below or between which the blockage is estimated to have occurred.

At block 613, the resistance monitoring system determines the progress of the fluid flow. The resistance monitoring system can determine an estimated location which the fluid has reached based on the temperatures determined from TEC resistance data. For instance, the resistance monitoring system can generate a notification indicating the estimated location with respect to the measured depths of the downhole gauges.

At block 615, the resistance monitoring system calculates the temperature based on TEC resistance data. The resistance monitoring system can calculate the temperature for one or more locations downhole with respect to the downhole gauges using Equation 1. For instance, with reference to FIG. 2, the resistance monitoring system can calculate the temperature between the downhole gauges 103, 105 based on TEC resistance data with Equation 1.

At block 617, the resistance monitoring system determines whether the calculated temperature is within an expected range. The resistance monitoring system may maintain a range of expected temperatures corresponding to intervals of the TEC based on measured depth. The resistance monitoring system may compare the temperature calculated for each downhole interval, such as an interval between downhole gauges, with an expected range established for the interval. If the calculated temperature is within an expected range, operations continue at block 619. If the calculated temperature is not within an expected range, operations continue at block 601, where the resistance monitoring system continues to collect downhole electronics data and determine TEC resistance.

At block 619, the resistance monitoring system determines that a fluid with a different temperature has entered the borehole. Calculated temperatures outside of an expected range for an interval downhole may indicate that an unknown fluid has entered the well. For instance, with reference to FIG. 2, the resistance monitoring system may identify that the fluid 204 has entered the borehole based on the temperature calculated for the interval between the downhole gauges 103, 105 falling outside of an expected range of temperatures. The resistance monitoring system may generate a notification indicating that a fluid has entered the borehole. Operations continue at block 601, where the resistance monitoring system continues to monitor the TEC resistance.

Figure 7:
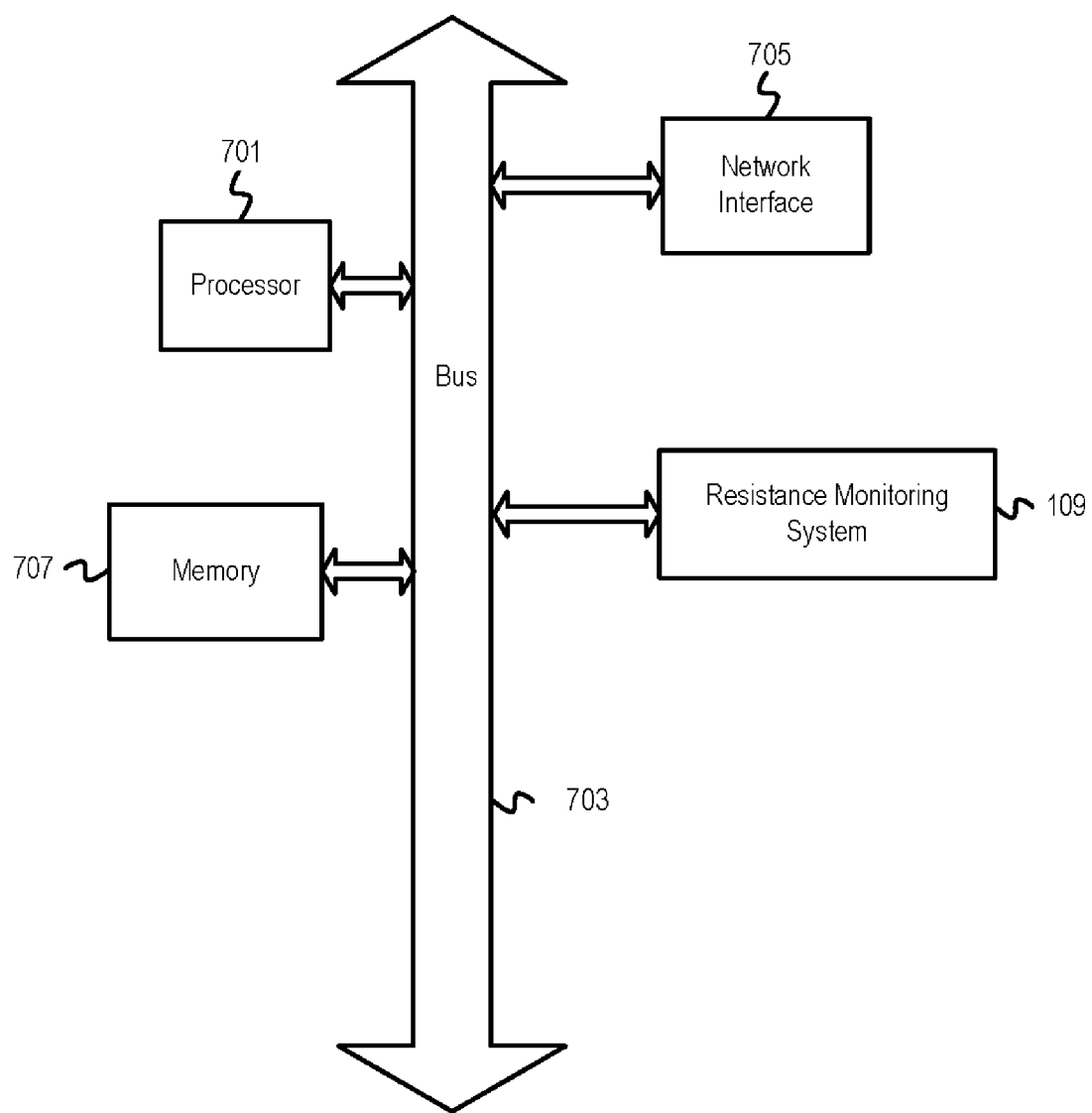
FIG. 7 depicts an example computer for resistance monitoring, according to some embodiments.

FIG. 7 depicts an example computer for resistance monitoring, according to some embodiments. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus 703 and a network interface 705. The system communicates via transmissions to and/or from remote devices via the network interface 705 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.). The system also includes resistance monitoring system 109. The resistance monitoring system 109 determines resistance of a TEC in a downhole environment based on downhole electronics data and identifies downhole fluid events based on the TEC resistance. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

While the aspects of the disclosure are described with reference to various implementations and exploitations, it will be understood that these aspects are illustrative and that the scope of the claims is not limited to them. In general, techniques for measuring and monitoring resistance of a TEC deployed in a downhole system as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 507 and 509 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Embodiment 1: A method comprising: monitoring a resistance over time of a tubing encased conductor (TEC) that electrically connects a first downhole gauge to a second downhole gauge positioned in a borehole deeper than the first downhole gauge; and detecting that a first TEC fault has occurred in the TEC, in response to a change in the resistance being greater than a fault occurrence threshold and in response to an amount of the time of the change being smaller than a fault time threshold. Embodiment 2: The method of Embodiment 1, further comprising detecting that a change in a distributed temperature between the first downhole gauge and the second downhole gauge has occurred, in response to the change in the resistance being less than the fault occurrence threshold but greater than a temperature change threshold, or in response to the amount of the time of the change being greater than the fault time threshold but less than a temperature time threshold. Embodiment 3: The method of Embodiment 2, further comprising determining that a flow of at least one of a gas and a liquid is either entering the borehole from a subsurface formation around the borehole or being injected into the borehole from a surface of the borehole in response to detecting that the change in the distributed temperature between the first downhole gauge and the second downhole gauge has occurred. Embodiment 4: The method of Embodiment 2 or 3, further comprising determining that a flow of at least one of a gas and a liquid is entering the borehole from a subsurface formation around the borehole between the first downhole gauge and the second downhole gauge in response to detecting that the change in the distributed temperature between the first downhole gauge and the second downhole gauge has occurred. Embodiment 5: The method of any one of Embodiments 1-4, wherein the first downhole gauge comprises a feedthrough for passage of the TEC from a source at the surface of the borehole to the second downhole gauge, wherein the method comprises, powering the first downhole gauge from the source at a surface of the borehole via the TEC; preventing transmission of power via the TEC by the first downhole gauge to the second downhole gauge; performing a direct current measurement, by the first downhole gauge, of a current received from the source via the TEC; performing an indirect current measurement, by the source, of the current delivered by the source to the first downhole gauge via the TEC; and determining that there is a second TEC fault between the source at the surface and the first downhole gauge based on a difference between the direct current measurement and the indirect current measurement. Embodiment 6: The method of Embodiment 5, wherein determining that there is the second TEC fault between the source at the surface and the first downhole gauge comprises determining that there is a current leak in the TEC between the source at the surface and the first downhole gauge, in response to the indirect current measurement being greater than the direct current measurement. Embodiment 7: The method of any one of Embodiments 1-6, wherein the first TEC fault comprises at least one of a short circuit, an open circuit, and a leakage current. Embodiment 8: The method of Embodiment 7, wherein the first downhole gauge comprises a feedthrough for passage of the TEC from a source at the surface of the borehole to the second downhole gauge, wherein the method comprises, detecting that a change in a distributed temperature between the surface and the first downhole gauge has not occurred, in response to the change in the resistance being less than the temperature change threshold, or in response to the amount of the time of the change being greater than the temperature time threshold. Embodiment 9: The method of Embodiment 8, further comprising determining that a blockage of a flow of the at least one of the gas and the liquid to the surface has occurred in response to detecting that the change in the distributed temperature between the surface and the first downhole gauge has not occurred.

Embodiment 10: A system comprising: a first downhole gauge to be positioned in a borehole drilled into a subsurface formation; a second downhole gauge to be positioned in the borehole deeper than the first downhole gauge; a tubing encased conductor (TEC) positioned in the borehole to electrical connect the first downhole gauge to the second downhole gauge; a processor; and a machine-readable medium having program code executable by the processor to cause the processor to, monitor a resistance over time of the TEC; and detect that a first TEC fault has occurred in the TEC, in response to a change in the resistance being greater than a fault occurrence threshold and in response to an amount of the time of the change being smaller than a fault time threshold. Embodiment 11: The system of Embodiment 10, wherein the program code comprises program code executable by the processor to cause the processor to: detect that a change in a distributed temperature between the first downhole gauge and the second downhole gauge has occurred, in response to the change in the resistance being less than the fault occurrence threshold but greater than a temperature change threshold, or in response to the amount of the time of the change being greater than the fault time threshold but less than a temperature time threshold. Embodiment 12: The system of Embodiment 11, wherein the program code comprises program code executable by the processor to cause the processor to: determine that a flow of at least one of a gas and a liquid is either entering the borehole from subsurface formation around the borehole or being injected into the borehole from a surface of the borehole in response to detecting that the change in the distributed temperature between the first downhole gauge and the second downhole gauge has occurred. Embodiment 13: The system of any one of Embodiments 10-12, wherein the first downhole gauge comprises a feedthrough for passage of the TEC from a source at the surface of the borehole to the second downhole gauge, the program code comprises program code executable by the processor to cause the processor to: power the first downhole gauge from the source at a surface of the borehole via the TEC; prevent transmission of power via the TEC by the first downhole gauge to the second downhole gauge; and determine that there is a second TEC fault between the source at the surface and the first downhole gauge based on a difference between a direct current measurement and an indirect current measurement, wherein the direct current measurement is to be performed by the first downhole gauge, of a current received from the source via the TEC, and wherein the indirect current measurement is to be performed by the source, of the current delivered by the source to the first downhole gauge via the TEC. Embodiment 14: The system of Embodiment 13, wherein the program code executable by the processor to cause the processor to determine that there is the second TEC fault between the source at the surface and the first downhole gauge comprises program code executable by the processor to cause the processor to determine that there is a current leak in the TEC between the source at the surface and the first downhole gauge, in response to the indirect current measurement being greater than the direct current measurement. Embodiment 15: The system of any one of Embodiments 10-14, wherein the first TEC fault comprises at least one of a short circuit, an open circuit, and a leakage current.

Embodiment 16: One or more non-transitory machine-readable media comprising program code executable by a processor to cause the processor to: monitor a resistance over time of a tubing encased conductor (TEC) that electrically connects a first downhole gauge to a second downhole gauge positioned in a borehole deeper than the first downhole gauge; and detect that a first TEC fault has occurred in the TEC, in response to a change in the resistance being greater than a fault occurrence threshold and in response to an amount of the time of the change being smaller than a fault time threshold. Embodiment 17: The one or more non-transitory machine-readable media of Embodiment 16, wherein the program code comprises program code executable by the processor to cause the processor to: detect that a change in a distributed temperature between the first downhole gauge and the second downhole gauge has occurred, in response to the change in the resistance being less than the fault occurrence threshold but greater than a temperature change threshold, or in response to the amount of the time of the change being greater than the fault time threshold but less than a temperature time threshold. Embodiment 18: The one or more non-transitory machine-readable media of Embodiment 17, wherein the program code comprises program code executable by the processor to cause the processor to: determine that a flow of at least one of a gas and a liquid is either entering the borehole from a subsurface formation around the borehole or being injected into the borehole from a surface of the borehole in response to detecting that the change in the distributed temperature between the first downhole gauge and the second downhole gauge has occurred. Embodiment 19: The one or more non-transitory machine-readable media of any one of Embodiments 16-18, wherein the first downhole gauge comprises a feedthrough for passage of the TEC from a source at the surface of the borehole to the second downhole gauge, wherein the program code comprises program code executable by the processor to cause the processor to: power the first downhole gauge from the source at a surface of the borehole via the TEC; prevent transmission of power via the TEC by the first downhole gauge to the second downhole gauge; and determine that there is a second TEC fault between the source at the surface and the first downhole gauge based on a difference between a direct current measurement and an indirect current measurement, wherein the direct current measurement is to be performed by the first downhole gauge, of a current received from the source via the TEC, and wherein the indirect current measurement is to be performed by the source, of the current delivered by the source to the first downhole gauge via the TEC. Embodiment 20: The one or more non-transitory machine-readable media of Embodiment 19, wherein the program code executable by the processor to cause the processor to determine that there is the second TEC fault between the source at the surface and the first downhole gauge comprises program code executable by the processor to cause the processor to determine that there is a current leak in the TEC between the source at the surface and the first downhole gauge, in response to the indirect current measurement being greater than the direct current measurement.

What is claimed is:

1. A method comprising:
monitoring a resistance between a first downhole gauge and a second downhole gauge over time of a tubing encased conductor (TEC) that electrically connects the first downhole gauge to the second downhole gauge positioned in a borehole deeper than the first downhole gauge; and
detecting that a first TEC fault has occurred in the TEC,
in response to a change in the resistance being greater than a fault occurrence threshold and
in response to an amount of the time of the change being smaller than a fault time threshold.

2. The method of claim 1, further comprising:
detecting that a change in a distributed temperature between the first downhole gauge and the second downhole gauge has occurred,
in response to the change in the resistance being less than the fault occurrence threshold while the change in the distributed temperature calculated from the change in the resistance is greater than a temperature change threshold, or
in response to the amount of the time of the change in the distributed temperature being greater than the fault time threshold but less than a temperature time threshold.

3. The method of claim 2, further comprising determining that a flow of at least one of a gas and a liquid is either entering the borehole from a subsurface formation around the borehole or being injected into the borehole from a surface of the borehole in response to detecting that the change in the distributed temperature between the first downhole gauge and the second downhole gauge has occurred.

4. The method of claim 2, further comprising determining that a flow of at least one of a gas and a liquid is entering the borehole from a subsurface formation around the borehole between the first downhole gauge and the second downhole gauge in response to detecting that the change in the distributed temperature between the first downhole gauge and the second downhole gauge has occurred.

5. The method of claim 1,
wherein the first downhole gauge comprises a feed-through for passage of the TEC from a source at the surface of the borehole to the second downhole gauge, wherein the method comprises,
powering the first downhole gauge from the source at a surface of the borehole via the TEC;
preventing transmission of power via the TEC by the first downhole gauge to the second downhole gauge;
performing a direct current measurement, by the first downhole gauge, of a current received from the source via the TEC;
performing an indirect current measurement, by the source, of the current delivered by the source to the first downhole gauge via the TEC; and
determining that there is a second TEC fault between the source at the surface and the first downhole gauge based on a difference between the direct current measurement and the indirect current measurement.

6. The method of claim 5, wherein determining that there is the second TEC fault between the source at the surface and the first downhole gauge comprises determining that there is a current leak in the TEC between the source at the surface and the first downhole gauge, in response to the indirect current measurement being greater than the direct current measurement.

7. The method of claim 1, wherein the first TEC fault comprises at least one of a short circuit, an open circuit, or a leakage current.

8. The method of claim 7,
wherein the first downhole gauge comprises a feed-through for passage of the TEC from a source at the surface of the borehole to the second downhole gauge, wherein the method comprises,
detecting that a change in a distributed temperature between the surface and the first downhole gauge has not occurred,
in response to the change in the distributed temperature calculated from the change in the resistance being less than a temperature change threshold, or
in response to the amount of the time of the change in the distributed temperature being greater than a temperature time threshold.

9. The method of claim 8, further comprising determining that a blockage of a flow of at least one of a gas and a liquid to the surface has occurred in response to detecting that the change in the distributed temperature between the surface and the first downhole gauge has not occurred.

10. A system comprising:
a first downhole gauge to be positioned in a borehole drilled into a subsurface formation;
a second downhole gauge to be positioned in the borehole deeper than the first downhole gauge;
a tubing encased conductor (TEC) positioned in the borehole to electrical connect the first downhole gauge to the second downhole gauge;
a processor; and
a machine-readable medium having program code executable by the processor to cause the processor to,
monitor a resistance over time of the TEC between the first and the second downhole gauges; and
detect that a first TEC fault has occurred in the TEC,
in response to a change in the resistance being greater than a fault occurrence threshold and
in response to an amount of the time of the change being smaller than a fault time threshold.

11. The system of claim 10, wherein the program code comprises program code executable by the processor to cause the processor to:
detect that a change in a distributed temperature between the first downhole gauge and the second downhole gauge has occurred,
in response to the change in the resistance being less than the fault occurrence threshold while the change in the distributed temperature calculated from the change in the resistance is greater than a temperature change threshold, or in response to the amount of the time of the change in the distributed temperature being greater than the fault time threshold but less than a temperature time threshold.

12. The system of claim 11, wherein the program code comprises program code executable by the processor to cause the processor to:
determine that a flow of at least one of a gas and a liquid is either entering the borehole from subsurface formation around the borehole or being injected into the borehole from a surface of the borehole in response to detecting that the change in the distributed temperature between the first downhole gauge and the second downhole gauge has occurred.

13. The system of claim 10,
wherein the first downhole gauge comprises a feedthrough for passage of the TEC from a source at the surface of the borehole to the second downhole gauge,
the program code comprises program code executable by the processor to cause the processor to:
power the first downhole gauge from the source at a surface of the borehole via the TEC;
prevent transmission of power via the TEC by the first downhole gauge to the second downhole gauge; and
determine that there is a second TEC fault between the source at the surface and the first downhole gauge based on a difference between a direct current measurement and an indirect current measurement,
wherein the direct current measurement is to be performed by the first downhole gauge, of a current received from the source via the TEC, and
wherein the indirect current measurement is to be performed by the source of the current delivered by the source to the first downhole gauge via the TEC.

14. The system of claim 13, wherein the program code executable by the processor to cause the processor to determine that there is the second TEC fault between the source at the surface and the first downhole gauge comprises program code executable by the processor to cause the processor to determine that there is a current leak in the TEC between the source at the surface and the first downhole gauge, in response to the indirect current measurement being greater than the direct current measurement.

15. The system of claim 10, wherein the first TEC fault comprises at least one of a short circuit, an open circuit, or a leakage current.

16. One or more non-transitory machine-readable media comprising program code executable by a processor to cause the processor to:
monitor a resistance over time, between a first downhole gauge and a second downhole gauge, of a tubing encased conductor (TEC) that electrically connects the first downhole gauge to the second downhole gauge positioned in a borehole deeper than the first downhole gauge; and
detect that a first TEC fault has occurred in the TEC,
in response to a change in the resistance being greater than a fault occurrence threshold and
in response to an amount of the time of the change being smaller than a fault time threshold.

17. The one or more non-transitory machine-readable media of claim 16, wherein the program code comprises program code executable by the processor to cause the processor to:
detect that a change in a distributed temperature between the first downhole gauge and the second downhole gauge has occurred,
in response to the change in the resistance being less than the fault occurrence threshold while the change in distributed temperature calculated from the change in the resistance is greater than a temperature change threshold, or
in response to the amount of the time of the change in the distributed temperature being greater than the fault time threshold but less than a temperature time threshold.

18. The one or more non-transitory machine-readable media of claim 17, wherein the program code comprises program code executable by the processor to cause the processor to:
determine that a flow of at least one of a gas and a liquid is either entering the borehole from a subsurface formation around the borehole or being injected into the borehole from a surface of the borehole in response to detecting that the change in the distributed temperature between the first downhole gauge and the second downhole gauge has occurred.

19. The one or more non-transitory machine-readable media of claim 16,
wherein the first downhole gauge comprises a feedthrough for passage of the TEC from a source at the surface of the borehole to the second downhole gauge,
wherein the program code comprises program code executable by the processor to cause the processor to:
power the first downhole gauge from the source at a surface of the borehole via the TEC;
prevent transmission of power via the TEC by the first downhole gauge to the second downhole gauge; and
determine that there is a second TEC fault between the source at the surface and the first downhole gauge based on a difference between a direct current measurement and an indirect current measurement,
wherein the direct current measurement is to be performed by the first downhole gauge, of a current received from the source via the TEC, and
wherein the indirect current measurement is to be performed by the source of the current delivered by the source to the first downhole gauge via the TEC.

20. The one or more non-transitory machine-readable media of claim 19, wherein the program code executable by the processor to cause the processor to determine that there is the second TEC fault between the source at the surface and the first downhole gauge comprises program code executable by the processor to cause the processor to determine that there is a current leak in the TEC between the source at the surface and the first downhole gauge, in response to the indirect current measurement being greater than the direct current measurement.

21. The one or more non-transitory machine-readable media of claim 16, wherein the first TEC fault comprises at least one of a short circuit, an open circuit, or a leakage current.

* * * * *